W. L. WYCKOFF.
CALCULATING RULE.
APPLICATION FILED OCT. 10, 1916.
1,423,896.
Patented July 25, 1922.
3 SHEETS—SHEET 3.
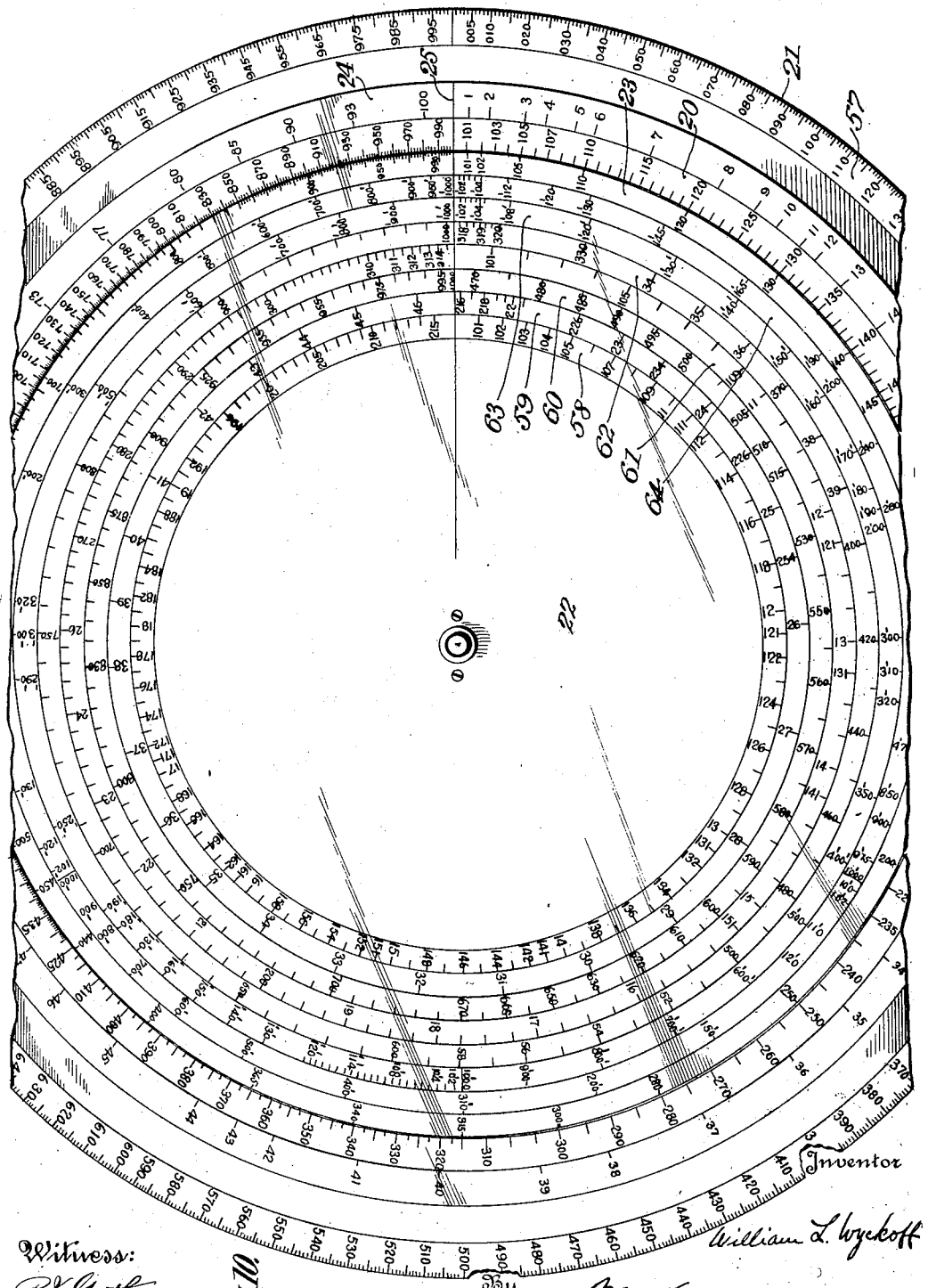

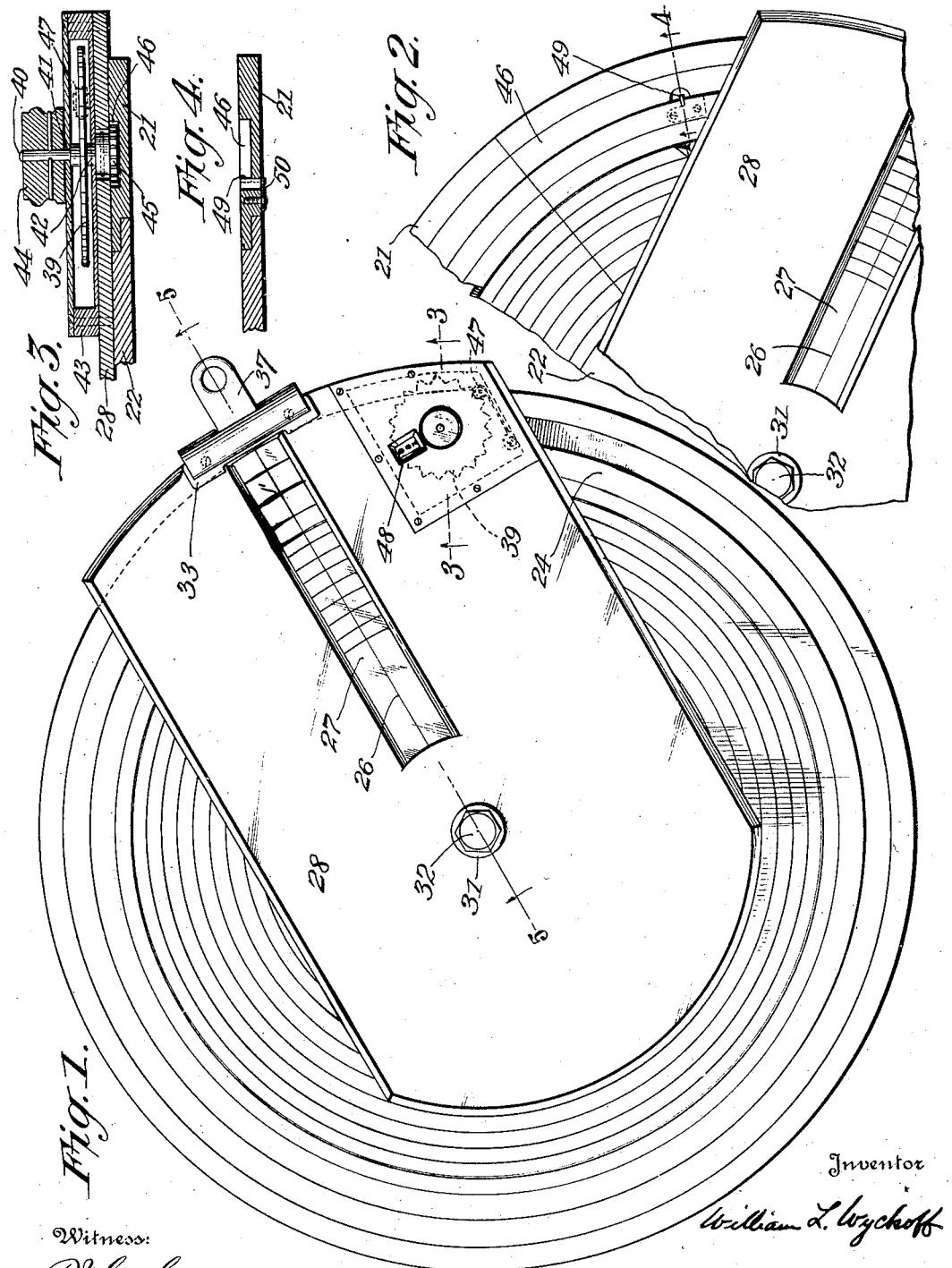

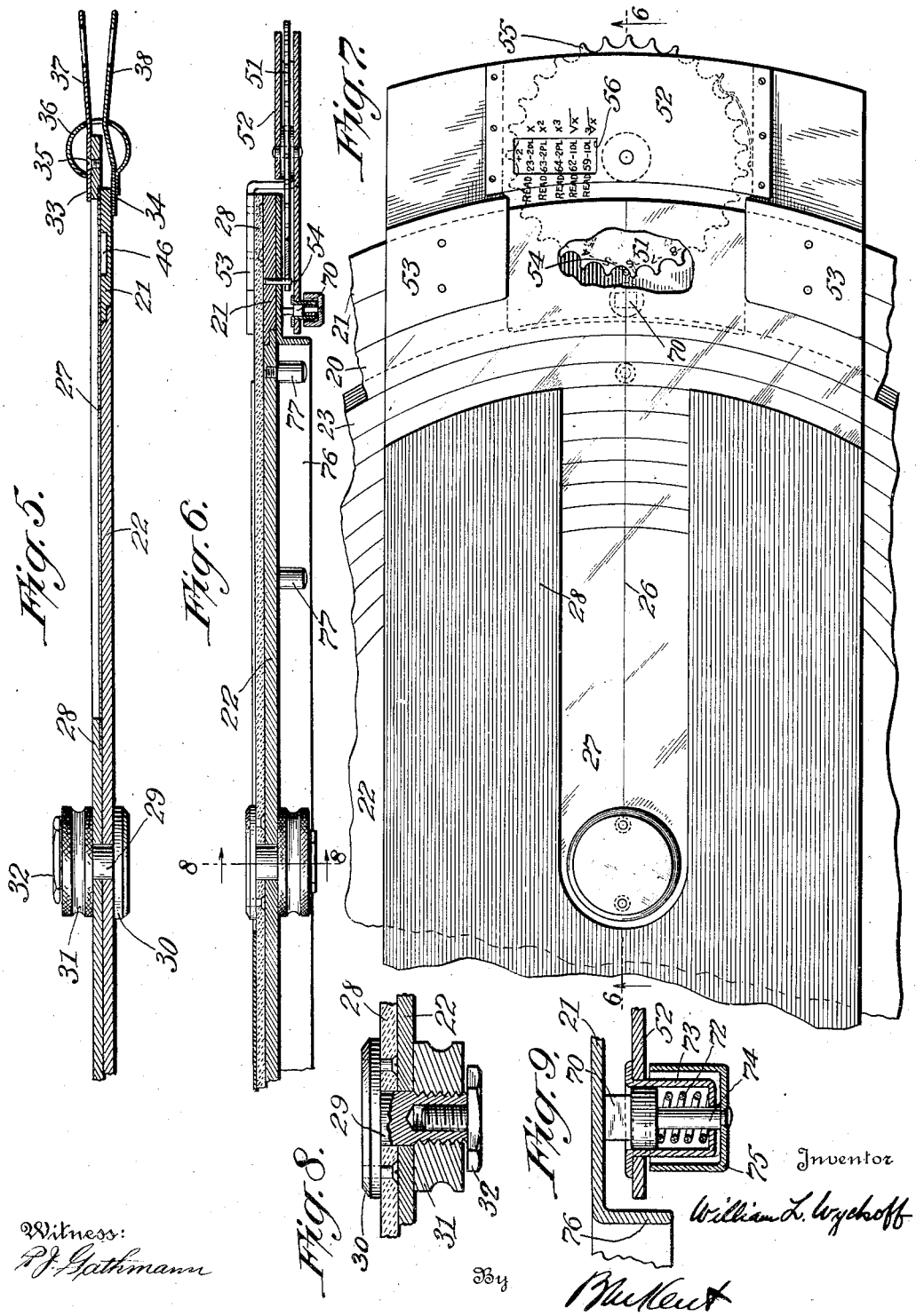

UNITED STATES PATENT OFFICE.

WILLIAM L. WYCKOFF, OF BROOKLYN, NEW YORK.

CALCULATING RULE.

1,423,896.   Specification of Letters Patent.   Patented July 25, 1922.

Application filed October 10, 1916.   Serial No. 124,833.

*To all whom it may concern:*

Be it known that I, WILLIAM L. WYCKOFF, a citizen of the United States, residing at Brooklyn, in the county of Kings and State of New York, have invented certain new and useful Improvements in Calculating Rules, of which the following is a specification.

This invention relates to calculating rules and certain features are especially adapted to circular slide rules.

One of the objects of the invention is to provide a reliable, automatically operating indicator for showing the position of the decimal point in the result which has been obtained on the rule. A further object is to provide an improved arrangement of scales whereby the computations on the rule are facilitated and greater accuracy obtained. A further object is to provide an improved form of conversion factor scale whereby computations are facilitated and greater accuracy obtained. A further object is to provide an improved form of root scales which, also taken in connection with the other novel features, will facilitate the use of the rule and give greater accuracy.

Other objects and the features of novelty will be apparent from the following description taken in connection with the accompanying drawings in which, Fig. 1 is a plan view of a rule embodying the invention;

Fig. 2 is a fragmentary plan showing a detail which does not appear in Fig. 1;

Fig. 3 is a section on the line 3—3 of Fig. 1;

Fig. 4 is a section on the line 4—4 of Fig. 2;

Fig. 5 is an enlarged section on the line 5—5 of Fig. 1;

Fig. 6 is a section on the line 6—6 of Fig. 7;

Fig. 7 is a fragmentary plan of a modified form of rule;

Fig. 8 is an enlarged section on line 8—8 of Fig. 6;

Fig. 9 is an enlarged fragment of Fig. 6;

Fig. 10 is a plan showing the different scales in detail.

It is customary to designate the two principal relatively movable scales of a slide rule as the "A" and "B" scales, respectively, and, in the manipulation of the rule, the initial multiplicand or dividend and partial and final results are located on the "A" scale and the multiplier or divisor on the "B" scale. Referring to the drawings, it will be observed that I have illustrated the invention in connection with a circular slide rule but it will be understood that many of the features of novelty are adapted to more general application. The "A" scale is indicated at 20 and is on a ring 21 which has a sliding fit on the periphery of the disk 22. Adjoining the "A" scale on the inner side is the "B" scale 23 which is on the disk 22 so that relative movement of these scales is effected by moving the disk relatively to the ring 21. The "A" and "B" scales are identical and represent the numbers between any two consecutive integral powers of ten, are laid off according to the mantissa of the logarithm of the numbers.

Arranged outside of the "A" scale 20 and preferably in fixed relation thereto is a conversion factor scale 24. The graduations on this scale are irregularly arranged and numbered consecutively from a line 25 which is a projection of the base line of the scale 20. The scale 24 is used for converting numbers from one denomination to another, as from cubic feet to gallons, pounds per square inch to kilograms per square centimeter, etc. In connection with the scale 24 there will be a table, preferably arranged on the back of the disk 22, giving the different conversion factors and these factors will be numbered consecutively according to the order of the mantissa of their logarithms. The conversion factors will also be located on the scale 24 according to the mantissa of their logarithms, or, in other words, according to the graduations on the scale 20 and in alinement with the latter. The only markings, however, on the scale 24 will be the graduations for the various conversion factors and their abovementioned consecutive numbers and since these graduations will be accurately located in the manufacture of the rule, greater accuracy is possible in the use of the rule than in the case of the constructions heretofore used in which it is necessary to locate the conversion factor on the "A" scale by means of a hairline, which in the rule illustrated is indicated at 26 on a transparent portion 27 of the runner 28. The runner 28 is pivoted at the center of the disk 22 and may be turned to locate the hairline 26 over any part of the scales 20 or 23.

In using the scale 24, the table of conversion factors, above-mentioned, will be consulted and the number of the particular factor desired will be ascertained therefrom. The runner 28 is then moved to bring the hairline 26 over the division of the scale 24, that bears the number ascertained from the table. The base line of the scale 23 is then brought under the hairline 26 and conversions made by locating the number to be converted on the scale 23 and reading the result directly from the division of the "A" scale in radial alinement with the said number. It will be apparent that any number of conversions by the same factor may be effected at one setting of the rule. The location of the decimal point in the result of the above operation may be determined by means of the novel indicator which will be hereinafter described.

The runner 28 may be of any suitable form but I prefer to make it relatively large so as to provide space for complete directions for using the rule. A pivot bolt 29 (see Fig. 5) projects through the disk 22 and runner 28 and is provided with a head 30 on the bottom of the disk, and a clamping nut 31 above the runner whereby the disk and runner may be clamped together whenever desired. Above the nut 31 is a screw 32 which is carried by the pivot 29 and serves as a lock for the nut 31 when the latter is free from the runner 28. In Figure 8, the parts are shown in section, the pivot 29 being inverted from the position shown in Figure 5, but the construction is substantially the same as just described.

At its outer end the runner 28 carries a clamping device for securing the runner to the ring 21. This clamping device, as shown, consists of a pair of clamps 33 and 34, the clamp 33 being secured to the runner 28 by screws 35. The clamps 33 and 34 have in cooperation therewith a cylindrical spring 36 through which the operating arms 37 and 38 project. The spring 36 normally clamps the runner 28 and ring 21 together but when is is desired to move the runner the arms 37 and 38 are pressed together and may then be used as a handle for conveniently moving the runner.

The operations performed on a slide rule are either in multiplication or division, which, by the use of logarithms, are reduced to addition and subtraction. However, in a slide rule only the mantissa of the logarithm is used and, therefore, the result which is read from the scales does not indicate the characteristic of the logarithm or, in other words, the position of the decimal point, with reference to the significant figures of the result, is not known. In performing multiplication by means of logarithms, the logarithms of the factors are added, and in performing division the logarithms are subtracted, and the characteristic of the logarithm of a number depends upon the number of digits to the left of the decimal point, or the number of ciphers to the right of the decimal point in the number.

I have provided an indicator that shows directly, the number of digits to the left of the decimal point, or the number of ciphers to the right of the decimal point, in the final result. This indicator, in the form illustrated in Figs. 1 and 3, comprises a dial 39 mounted upon a pivot 40 which is journaled at 41 and 42 in a casing 43 carried by the runner 28. The pivot 40 has rigidly secured thereon, on the top of the casing 43, a knob 44 by means of which the dial 39 may be rotated to set the indicator. The pivot 40 also has secured thereon a wheel 45 having a notched periphery, this wheel being arranged below the plane of the runner 28 and in a groove 46 in the ring 21. The dial 39 also has a notched periphery with which a detent 47 engages for the purpose of holding the dial in different positions. The casing 43 has a slot 48 through which numbers on the dial 39 may be seen. A finger 49 carried by the plate 50, which is secured to the ring 21 (see Figure 4) projects into the groove 46 at one side of the latter and is so positioned that when the hairline 26 is directly over the base line of the scale 20, the finger will be in engagement with the wheel 45. This causes the dial 39 to be moved one space whenever the hairline 26 passes the base line of the scale 20, in the movements of the runner 28.

In the form shown in Figs. 6 and 7, the indicator comprises a dial 51 which is pivotally mounted in a casing 52 secured on the runner 28 by means of brackets 53, the casing 52 extending beneath the ring 21, as clearly shown in Fig. 6. The dial 51 has a notched periphery which is adapted to be engaged by the pin 54 on the ring 21. The pin 54 is so positioned that the dial 51 will be moved one space whenever the hairline 26 passes the base line of the scale 20. The dial 51 projects from the side of the casing 52, at 55, and may through this means be conveniently rotated by one's finger. The casing 52 has a slot 56 through which numbers on the dial 51 appear.

Referring to Fig. 10, in which the details and arrangement of the scales are shown, the outermost scale 57, on the ring 21 is a master scale graduated into 1,000 equal parts and bearing numbers representing mantissas of the logarithms of the numbers on the scale 20 in radial alinement therewith. The scales 20 and 23 are graduated according to the master scale 57 but the graduations are numbered from 101 to 990, the graduations for 100 and 1000 coinciding and being the base line of the scales. The frequency of the numbers on the scales will be determined by the space limitations thereon, the larger scales permitting more numbers to be indicated than the smaller scales. The three inner circles of graduations 58, 59 and 60, constitute a scale of cubes, the graduations on which represent the cube roots of numbers in alinement therewith on the scale 23. The cube root of 10 is 2.1544, the cube root of 100 is 4.6415 and the cube root of 1000 is 10. But 10, 100 and 1000 on the scale 23 coincide and therefore 2.1544, 4.6415 and 10 must coincide on the cube scale, which necessitates making the cube scale in the form of three sub-scales 58, 59 and 60, each of which is a complete circle, as shown. On account of the cube scale comprising three sub-scales, it is evident that it will be necessary to know on which of the three sub-scales a desired root, of a number located on the scale 23, is to be read and this will be described hereinafter.

The two circles of graduations 61 and 62 constitute a scale of squares, the graduations on which represent square roots of numbers in alinement therewith on the scale 23. The square root of 10 is 3.162 and the square root of 100 is 10. But 10 and 100 coincide on the scale 23 and therefore 3.162 and 10 must coincide on the scale of squares, which necessitates making the scale of squares in the form of two sub-scales 61 and 62, each of which is a complete circle, as shown. The manner of determining on which of the scales 61 and 62 the root of a desired number, located on the scale 23, may be read, will be described hereinafter.

The circle of graduations adjoining the outer side of scale 62 is a square root scale 63, the graduations on which represent the squares of numbers in alinement therewith on the scale 23. Since the squares of numbers between 1 and 3.162 fall between 1 and 10 and the squares of numbers between 3.162 and 10 fall between 10 and 100 and since 3.162 is at the middle point of the scale 23, it is evident that the square root scale must comprise two sub-scales or divisions each of which extends over an arc of 180°. To facilitate the use of the rule as will be hereinafter described, the numbers on each of the divisions of scale 63, are divided into periods, those on one division all having one digit in the left hand period and those on the other division having two digits in the left hand period.

The scale adjoining the outer side of scale 63 is the cube root scale 64, the graduations on which represent the cubes of numbers in alinement therewith on scale 23. Since the cubes of numbers between 1 and 2.1544 fall between 1 and 10, and the cubes of numbers between 4.6415 and 10 fall between 100 and 1000 and, since the graduations for 2.1544 and 4.6415 divide the scale 23 into three equal parts, it will be evident that the cube root scale 64 must comprise three sub-scales or divisions. To facilitate the use of the rule, as will be hereinafter described, the numbers on each of the divisions of scale 64 are divided into periods, those on one division all having one digit in the left hand period and those on the second division all having two digits in the left hand period and those on the third division all having three digits in the left hand period.

It will be evident that the principle of arranging and marking the square and cube scales as well as the square root and cube root scales may be applied to scales of higher powers or roots and the scales illustrated and described are sufficient to disclose the principles of this feature of my invention.

Referring now to Figure 7, and the following is also applicable to the construction illustrated in Fig. 1, being omitted therefrom because of the relatively reduced scale on which Fig. 1 is drawn, it will be observed that there is arranged alongside the slot 56, a series of markings and to illustrate the principles of the indicator device, I have chosen for these markings, "Read $x$," "Read $x^2$," "Read $x^3$," "Read $\sqrt{x}$," "Read $\sqrt[3]{x}$," it being understood that any preferred sets of markings to correspond with the scales of the rule may be used. It will also be seen that there is a set of indications on the dial 51 alining with each of the above-mentioned markings. There also appears on the dial 51, at the top of the slot 56, the mark +2. The letters D, P, and L appearing on the dial 51 indicate, respectively, "digits," "periods," and "left." The letters C and R may also be used to indicate "ciphers" and "right," respectively. The +2, above referred to on the dial 51, signifies two digits to the left of the decimal point and it will be understood that the dial will have a complete series of markings corresponding to the range of numbers for which the indicator is designed. These markings begin at 0 digits to the left of the decimal point and 0 ciphers to the right of the decimal point and are then consecutively arranged on either side of the 0, on one side being +1, +2, +3, etc., and on the other side —1, —2, —3, etc., the plus sign indicating digits and the minus sign, ciphers. It will be understood that the markings are arranged radially on the dial in a manner similar to the set shown and that each of the plus and minus numbers on the dial will have its corresponding set of radially arranged markings.

Assuming that a given equation of numbers to be solved contains factors in the numerator and factors in the denominator, as for example:

$$\frac{79 \times 13.9 \times 0.057 \times 530}{470 \times 0.00289 \times 357900} = Y$$

The digits to the left of the decimal point in the various factors are counted and considered as positive, and the ciphers to the right of the decimal point in the factors are counted and considered as negative, thus:

$$\frac{+2+2-1+3}{+3-2+6} = \frac{+6}{+7}$$

The denominator is algebraically subtracted from the numerator, which results in $-1$. In manipulating the rule to solve the above problem, the runner 28 is shifted to bring the hairline 26 over 79, on scale 20, 79 being the first factor of the numerator. The dial 51 is then set to show in slot 56, $-1$, the number obtained by counting the digits and ciphers in the factors as above described. The disk 22 is then shifted, relatively to the ring 21 to bring 470, on scale 23 under the hairline, 470 being the first factor of the denominator. The runner 28 is then shifted to position the hairline 26 over 139 on scale 23, 13.9 being the second factor of the numerator. In this and all subsequent movements of the runner 28 it is necessary that the movement be in the direction of the smaller numbers on scale 23, that is counter-clockwise, if the factor is numerically smaller than the number under the hairline, on scale 23, and if the factor is numerically greater than the number under the hairline the runner is moved in the direction of the larger numbers on scale 23, that is clockwise. The disk 22 is then moved to bring the next factor of the denominator under the hairline and these operations are continued until all of the factors of the numerator and denominator have been used. In case there is an excess of factors in either the numerator or denominator enough factors of 1 are supplied to make the number of factors in numerator one more than in the denominator. When using the 1 factors of the numerator the runner is always moved counter-clockwise. Whenever, in the movements of the runner 28, the hairline 26 passes the base line of scale 20, the pin 54 will move the dial 51 according to the direction of movement of the runner. After all of the factors have been used the final result is on the scale 20, under the hairline 26 and, having been noted, the decimal point is located according to the number appearing in the slot 56, opposite "$x$." To obtain results from the other scales on disk 22, the scale 23 is then made to coincide with scale 20 without moving the hairline 26, and readings taken as hereinafter described.

In Fig. 7 the indication on the dial, opposite "Read $x$" is 23—2DL. This means that $x$ is read on the scale 23 and that there are two digits to the left of the decimal point. If the square of the result is desired the indication opposite "Read $x^2$" is used, this being, in Fig. 7, 63—2PL. The interpretation of this indication is that the square is on scale 63, under the hairline 26 and has two periods to the left of the decimal point. The number of digits in the left hand period of the number on scale 63 shows the number of digits in the left hand period of the desired square. If the cube of the result is desired, the indication opposite "Read $x^3$" is used, this being in Fig. 7, 64—2PL. The interpretation of this indication is that the cube is on the scale 64, under the hairline 26 and has two periods of digits to the left of the decimal point. The number of digits in the left hand period of the desired cube will be the same as the number of digits in the left hand period of the number on scale 64.

If the square root of the result is desired the indication opposite "Read $\sqrt{x}$" is used, this being in Fig. 7, 62—1DL. The interpretation of this indication is that the square root is on scale 62, under the hairline 26, and has one digit to the left of the decimal point.

If the cube root of the result is desired, the indication opposite "Read $\sqrt[3]{x}$" is used, this being in Fig. 7, 59—1DL. The interpretation of this indication is that the cube root is read on scale 59, under the hairline 26, and has one digit to the left of the decimal point.

From the foregoing it will be evident that the indicator may be elaborated to provide for the determination of higher powers and roots and also trigonometric functions.

For convenience and accuracy in the manipulation of the rule, I provide on the lower side thereof, as will appear from Figs. 6 and 9, an inward extension of the lower wall of the casing 52 carrying a brake 70, which is normally pressed against the ring 21 by a spring 72 in the cup 73, the latter being carried by the said extension. The brake 70 has a stem 74 which projects through the lower wall of the cup 73 and has secured thereon a thimble or other part 75 adapted to be seized by the thumb and forefinger of the operator to withdraw the brake 70 from the ring 21. The ring 21 also has a flange 76, thereon, that not only reinforces it but, being arranged adjacent the thimble 75, may be engaged by the sides of the operator's fingers and thus used to steady the movements of the runner and facilitate accurate adjustment thereof.

Pins 77 are provided on the disk 22, just within the flange 76 and may be used in adjusting the disk. In this case also the operator's fingers may engage the flange 76, to steady the movements of the disk and to facilitate accurate adjustment thereof.

While I have illustrated the invention as applied to a circular disk slide rule it will be evident from the foregoing that many of the novel features are equally well adapted to other types of rule having circular scales and it has been my purpose to include the same within the scope of the appended claims.

Having thus described my invention what I claim and desire to secure by Letters Patent is:

1. In a device of the class described, the combination of a plurality of coaxial relatively movable circular scales, a scale coaxial with the first-mentioned scales and in fixed relation to one of the same, the graduations on said scale representing and bearing numbers between two integral powers of ten and being divided into equal parts, said numbers being divided into periods with those numbers on the same one of said equal parts having the same number of digits in the left hand period, and means for alining the graduations on the relatively movable scales.

2. In a device of the class described, the combination of a plurality of coaxial relatively movable scales, a scale coaxial with the first-mentioned scales and in fixed relation to one of the same, the graduations on said scale representing and bearing numbers between two integral powers of ten and being divided into equal parts, said last-mentioned numbers being divided into periods with those numbers on the same one of said equal parts having the same number of digits in the left hand period, means for alining the graduations on the relatively movable scales, and an automatically actuated means for indicating the location of the decimal point in a result obtained on said device.

3. In a device of the class described, the combination of a plurality of coaxial relatively movable scales, a scale coaxial with and in fixed relation to one of the first-mentioned scales, and comprising a plurality of circular subscales, the numbers on each of which are integral roots of numbers between two consecutive integral powers of ten, and automatically actuated means for indicating the one of said subscales on which a desired result may be read.

4. In a device of the class described, the combination of a plurality of coaxial relatively movable scales, a scale coaxial with and in fixed relation to one of the first-mentioned scales, and comprising a plurality of circular subscales, the numbers on each of which are integral roots of numbers between two consecutive integral powers of ten, and means for indicating the one of said subscales on which a desired result may be read.

5. In a device of the class described, the combination of a plurality of coaxial relatively movable scales, a scale coaxial with and in fixed relation to one of the first-mentioned scales, and comprising a plurality of subscales, and means for indicating the one of said subscales on which a desired result may be read.

6. In a device of the class described, the combination of a plurality of coaxial relatively movable scales, a scale coaxial with and in fixed relation to one of the first-mentioned scales, and comprising a plurality of circular subscales, the numbers on each of which are integral roots of numbers between two consecutive integral powers of ten, and means for indicating the one of said subscales on which a desired result may be read and also the location of the decimal point in said result.

In testimony whereof I affix my signature.

WILLIAM L. WYCKOFF.

Witnesses:
G. A. COONAN,
FRANK G. ALLEN.